UNITED STATES PATENT OFFICE.

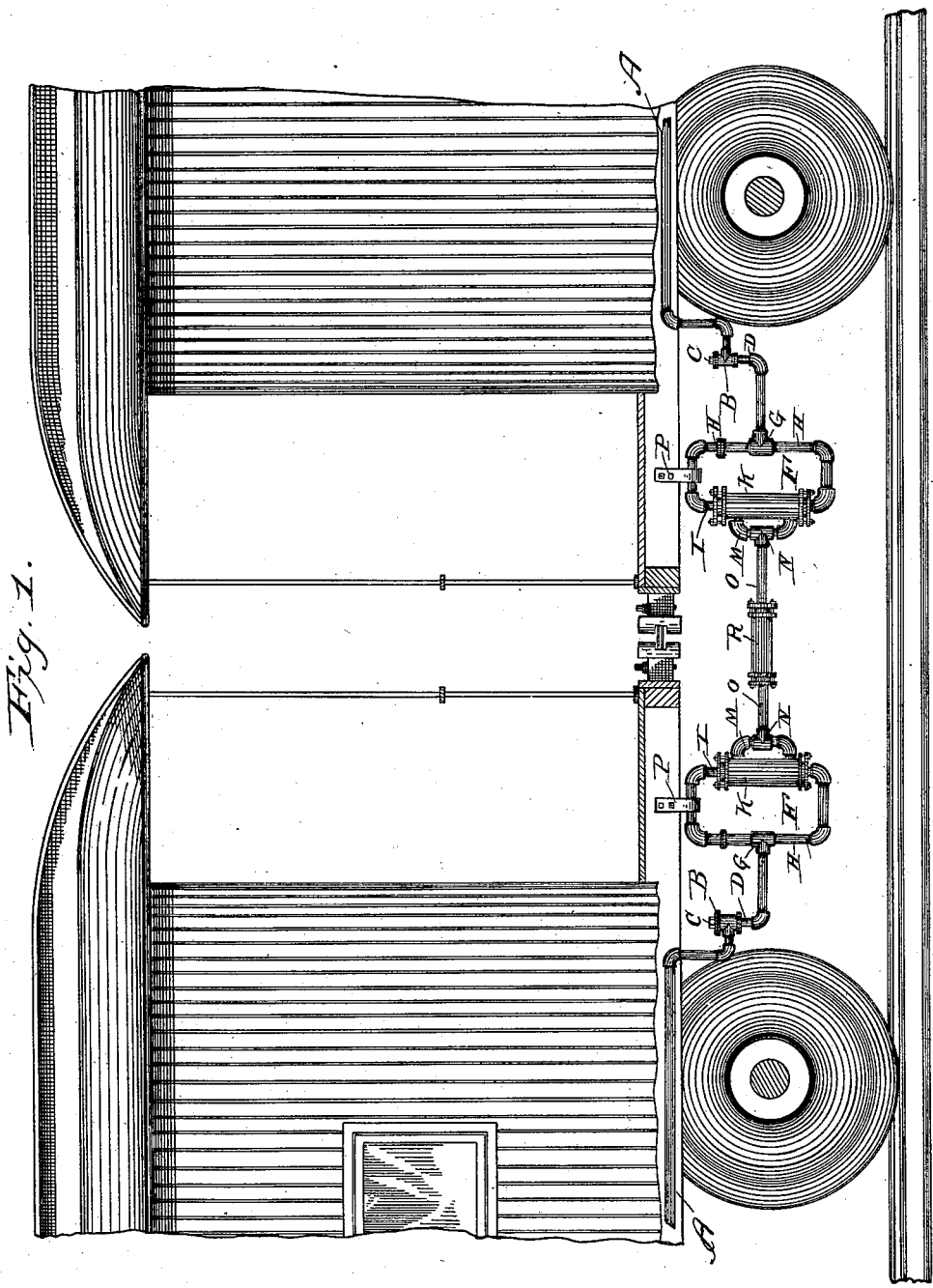

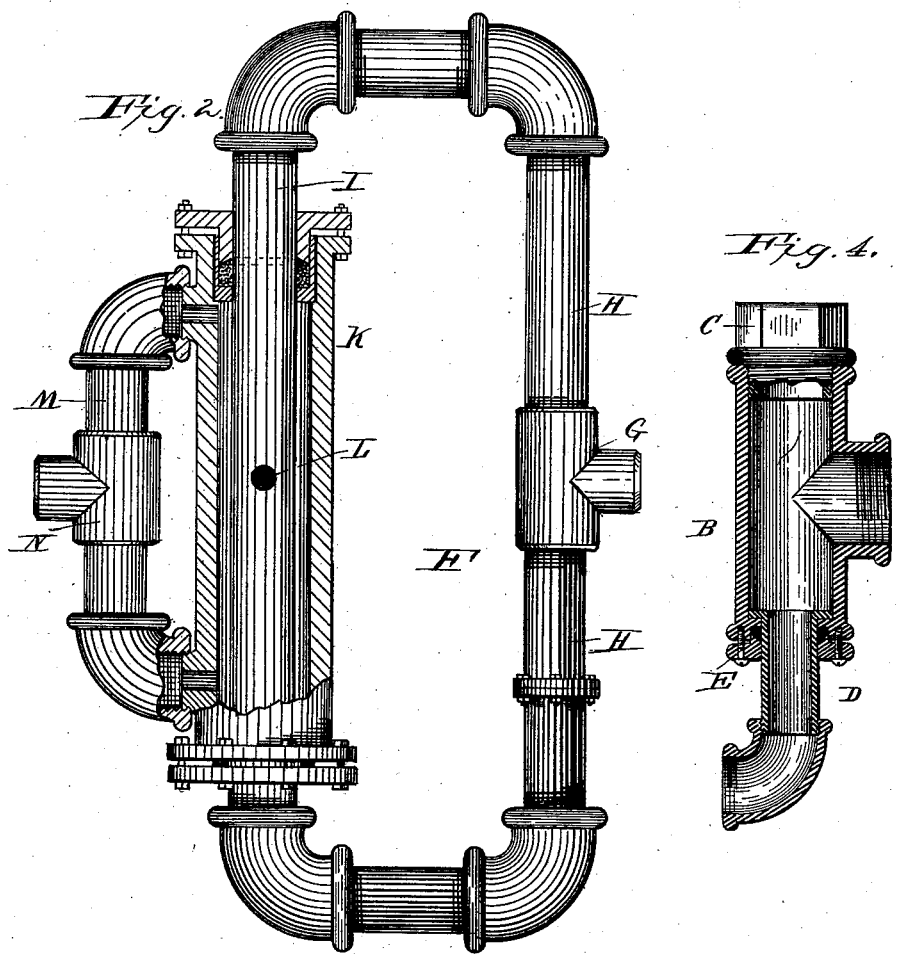

JOSEPH H. CHAMBERS, OF PLEASANT UNITY, ASSIGNOR OF ONE-HALF TO BENJAMIN F. BYERS, OF GREENSBURG, AND WILLIAM F. MILLER, OF PITTSBURG, PENNSYLVANIA.

PIPE-COUPLING FOR RAILROAD-CARS.

SPECIFICATION forming part of Letters Patent No. 370,606, dated September 27, 1887.

Application filed May 5, 1887. Serial No. 237,210. (No model.)

*To all whom it may concern:*

Be it known that I, JOSEPH H. CHAMBERS, a citizen of the United States, residing at Pleasant Unity, in the county of Westmoreland and State of Pennsylvania, have invented certain new and useful Improvements in Pipe-Couplings for Railroad-Cars, of which the following is a specification, reference being had therein to the accompanying drawings.

This invention consists in devices for joining systems of fluid-conveyers—such, for instance, as those used for heating cars—the object being to form a connection which will adapt itself to the varying conditions and changes of position incident to such systems without permitting leakage or looseness of joints.

A further object is to facilitate the coupling of the systems, as hereinafter set forth.

In the drawings, Figure 1 is a side elevation of the contiguous ends of two cars with the invention applied; Fig. 2, a partially sectional view of one of the coupling-pieces; Fig. 3, a partially sectional view of another of the coupling devices; Fig. 4, a sectional view of still another of the coupling devices.

A A, Fig. 1, are the contiguous ends of the pipes of the heating systems of two cars connected to cylinders B about midway of their length. Each of the cylinders B, as will be seen in Fig. 4, is open-ended—that is, is not permanently closed. One end of the cylinder B may be closed by a cap, C, and the other end carries a swivel-connection, D, held thereto by a suitable stuffing-box, E, and capable of rotary or longitudinal movement.

In the construction shown in Fig. 1 the cylinder B is placed in an upright position, with the connection B projecting downward and joined to a coupling, F. (Shown in detail in Fig. 2.) The pipe joining the connection D and coupling F is screwed into a T-joint, G, from each branch of which extend pipes H, each connected to one of the ends of a pipe, I, parallel with the pipes H, and with the latter and the connecting-pipes forming a substantially rectangular figure.

Surrounding the pipe I is a cylinder, K, having stuffing-boxes at each end, so that it may be moved longitudinally and be rotated on the said pipe I and the escape of fluid prevented. The pipe I communicates with the cylinder K through an orifice, L, so placed as to at no time be beyond the ends of the said cylinder, and the latter communicates at each end by means of suitable couplings or joints to a pipe, M, parallel with and at one side of the cylinder K. The pipe M includes a centrally-placed T joint or coupling, N, which latter carries a pipe, O, having the outer or free end contracted or beveled.

Each car is provided with the universal coupling-joint constituting the construction shown in Fig. 4, and also the coupling shown in Fig. 2, the said coupling being hung from the car by means of a bracket, P, encircling one of the connecting-pipes joining the pipes H and I, and arranged to permit the said coupling to swing laterally. The pipe O is also carried by the car.

When it is desired to couple the systems of two cars, the ends of the pipes O are inserted in the ends of a cylinder, R, having stuffing-boxes at each end. This box or cylinder is of sufficient length to permit longitudinal movement of the pipes O, but prevents their removal therefrom while the cars are coupled together.

The purpose of beveling the ends of the pipes O is to facilitate the insertion thereof in the cylinder R.

It will be seen that as the cars change position, as they constantly do when in motion, the pipes O, sliding in the cylinder R, will compensate for any change of distance between the cars without opening any joints. The coupling F will swing from side to side as the cars go around a curve, and the cylinder K will allow for vertical and lateral movements of the cars, and the coupling-joint between the coupling F and the pipe-heating systems will permit any relative lateral or vertical change of position of the coupling F. It is evident, therefore, that the device described will accommodate itself to any change of position between the cars.

I do not confine myself to the exact arrangement and construction shown, as the same may be varied, the essential feature of the invention being that changes of position of the cars shall be provided for and that the coupling of the systems shall be facilitated.

The invention may be applied to systems of watering stock, as well as to heating systems, and may be used wherever a universal connection is desirable.

Having described my invention, what I claim is—

1. A railroad pipe-coupling comprising the following elements: the main conduit-pipes A A, connected angular couplings with vertical cylinders B B, capped as described, the vertically movable and rotative pipes D, swivelly connected to the lower ends of said cylinders and working through packings thereof, a rectangular tubular frame, H I, communicating with said pipes D, the cylinder K, communicating with pipe I and vertically movable thereon, the pipes M, with their T-joints provided with pipes O, having tapered ends, and the coupling-cylinder R, provided with stuffing-boxes and adapted to receive said pipes O and to allow longitudinal play thereof, all substantially as described.

2. In a railroad-car pipe-coupling, the combination of two rectangular tubular frames, the hangers P therefor depending from the car-beds, the vertically-movable cylinders K on the perforated limbs of said frames, the tapered pipes O, communicating with said cylinders, the coupling-cylinder R, receiving said pipes O, the pipes A A and their vertical cylinders B, the pipes D, establishing communication between cylinders B and frames H I and adapted to oscillate horizontally and to receive vertical movement in said cylinders B, all substantially as described.

In testimony whereof I affix my signature in presence of two witnesses.

JOSEPH H. CHAMBERS.

Witnesses:
 BARNETT THOMAS,
 OLIVER R. SNYDER.